UNITED STATES PATENT OFFICE.

WILSON BENNETT, OF WELLINGTON, NEW ZEALAND.

METHOD OF PRODUCING A RUSTLESS IRON ALLOY.

No Drawing. Application filed December 4, 1922. Serial No. 604,899.

*To all whom it may concern:*

Be it known that I, WILSON BENNETT, a subject of the King of England, residing at Wellington, New Zealand, have invented certain new and useful Improvements in Methods of Producing a Rustless Iron Alloy, of which the following is a specification.

This invention relates to rustless iron and stainless steel and the process for producing the same.

One object of the invention is to produce rustless iron or stainless steel at a comparatively low cost by developing the same directly from ores, or the use of iron or steel scrap, or a combination of scrap and pig iron, by a series of continuous operations while the component metals are in a molten state, thus obviating the necessity of previously refining the different metals that go to make up the completed alloy, or the necessity of producing low carbon ferro chromium as a separate article and re-melting the same in combination with iron, steel, or scrap.

With these and other objects in view which will appear as the description proceeds, this invention consists in the novel features hereinafter described, and more particularly pointed out in the appended claims.

The use of the following equipment is essential to enable me to carry out my continuous process as herein stated:—

Blast furnace.—For the reduction of iron from its ore.

Bessemer converter.—For partially refining reduced molten metal.

Open hearth furnace.—For the melting of scrap, or a combination of scrap and pig iron and refining the charge by the aid of slags.

Electric furnaces.—For the reduction of chromium oxides from its ores and finally decarbonizing, deoxidizing and refining the completed materials.

For the reduction of chromium oxides from its ores I prefer to use an electric arc furnace, while to carry out the final decarbonizing, deoxidizing and refining processes, I use a combination electric furnace with upper and bottom electrodes. (I find the Greaves-Etchell electric furnace specially suitable to my requirements, but I do not confine myself solely to its use.)

The hearths of the electric furnaces should be composed of basic materials.

In producing the base of the rustless iron or stainless steel, one method I adopt is to reduce the iron from its ore in the blast furnace in the usual manner employed for the production of pig iron. The reduced iron while in a molten state is then transferred to the converter and subjected to the bessemerizing process until interrupted at a given stage. Molten metal from the cupola may be employed for this purpose. The metal is then transferred while in a molten state to the combination electric furnace for the final refining and deoxidizing process at the one and the same time.

Additional metals or ferro alloys may be added during the final refining process to suit requirements, such as molybdenum, vanadium, titanium, tungsten, copper, nickel, Monel metal, manganese and the like.

For an alloy containing percentages of nickel and copper I prefer to add the same in combination form, for example, in the form of Monel metal.

If scrap or a combination of scrap and pig iron is employed the same is melted and refined to requirements by the aid of slags in the basic open hearth furnace in the usual manner employed for ingot iron or steel manufacture, the molten metal being then transferred to the combination electric furnace and intimately mixed with the refined molten ferro chromium in the manner herein described and the final refining and deoxidizing process proceeded with.

As herein stated the reduction and refining of chromium oxide from its ores is carried out in separate electric furnaces in the presence of reducing agents which may be carbon, aluminium, silicon, calcium, calcium silicid, calcium carbide, magnesium or the like. I mean by reducing agents any metal element or compound or, any mixture of these in any proportion whatever, which, has or have the property of reducing the oxides or compounds of the combined metal or metals contained in the ore. The process is accompanied by the evolution of heat.

I prefer to use a reducing agent consisting of a combination of the above mentioned elements or compounds reduced out in some form, preferably in the form of a ferro alloy of these agents crushed to pass a ten mesh sieve and intimately mixed with the chromium ore and fluxing materials in such quantities or precentages as to ensure the complete metallic reduction from the chromium ore.

The combined charge of chromium ore and reducing agent intimately mixed with the fluxing materials is fed into the electric arc furnace and the current passed until complete metallic reduction is effected. The resultant mixture is a fused mass of chromium, iron and metalloids known as ferro chromium containing a variable amount of carbon in accordance with the nature and the amount of reducing agent employed. The reduced ferro chromium while in a molten state is transferred to the separate combination electric furnace for final decarbonizing and refining. A slagging mixture of a basic nature composed of lime and fluorspar may be employed in this stage of the process. I prefer, however, to use a neutralized slagging mixture and to this end silica or highly silicious material may be added to a slagging mixture such as that referred to, to secure the desired degree of neutrality.

I have discovered by numerous experiments that a neutralized slag with a covering of a substance rich in titanic oxide ($TiO_2$) for example, rutile, if applied thereto eliminates the high chromium oxide losses in the slag otherwise experienced when a purely basic slag is employed while at the same time eliminates carbon, silicon, sulphur and phosphorus to a marked degree together with the production of a slag of increased fluidity and fusibility. The temperature of the furnace is raised to form the neutralized slag as quickly as possible by the aid of the upper electrodes. When the slag is fused a quantity of the substance rich in titanic oxide is thrown evenly over its surface and by continued heating the titanic oxide becomes thoroughly incorporated with the other slagging materials. The combination electric furnace is then operated by using the bottom electrode setting up a constant flow of metal under the slag. Ferro chromium containing a variable amount of carbon, for instance, 1% to 6% may be employed if melted and subjected to the refining process as described above. The resultant refining slag is withdrawn from the furnace on completion of the refining process crushed and passed through the electric smelting furnace as raw material and slagging mixture for fluxing the initial reduction of chromium ore. By adopting this method the actual loss of chromium is extremely small. On completion the refined ferro chromium is intimately mixed with the refined iron in a separate combination electric furnace in such quantities or proportions to give the desired percentages in the completed material. A calicum carbide slag is formed and the furnace is operated by using the bottom electrode and a thoroughly homogeneous deoxidized metal will be obtained without additional stirring or rabbling.

Refined iron taken from the basic open hearth furnace may be employed as a base and the process proceeded with as herein described.

One method I employ for the production of rustless iron or stainless steel is to refine a charge or iron in the basic open hearth furnace and intimately mix the same with a desired proportion of refined molten ferro chromium in a hot ladle.

By employing the continuous method in the manner herein described a thoroughly homogeneous alloy can be produced containing any desired percentage of chromium, carbon, metals and metalloids to suit requirements.

As variations may be made in the alloy herein set forth without departing from the scope of this invention, it is to be understood that it is herein described as illustrative rather than in a limiting sense.

Having now described the nature of my invention what I claim as new is:

1. The method of producing a rustless iron alloy which consists in producing molten iron and partially refining the same, reducing the metal oxides of chromium ore, and refining the resultant metal in an electric furnace by the aid of suitable reducing and refining agents, transferring the molten iron and ferro-chromium to a separate combination arc and resistance electric furnace, and subjecting the combined charge to a final mixing, and refining and deoxidizing process at one and the same time.

2. The method of producing a rustless iron alloy which consists in first melting crude iron, partially refining the molten metal in an open hearth furnace, reducing the metal oxides of chromium ore and refining the resultant metal in an electric furnace by the aid of suitable reducing and refining agents, transferring the molten iron and ferro-chromium to a separate combination arc and resistance electric furnace, subjecting the combined charge to a final mixing, refining and deoxidizing process at one and the same time in the presence of a deoxidizing slag.

3. The method of producing ferro-chromium low in carbon and silicon by reducing the metal oxides of chromium ore with suitable reducing agents and refining the resultant metal in the presence of a neutralized slag rich in silicious or titanic material thereby eliminating heavy chromium oxide losses.

4. The method of producing neutralized slag containing lime and fluorspar which consists in adding thereto, after the slag is fused, a highly silicious material together with a quantity of a substance rich in titanic oxide.

5. The method of producing rustless iron alloy by a continuous direct process, from crude iron which consists in melting and partially refining the same in a suitable furnace, reducing the metal oxides of chromium ore and partially refining the resultant metal in an electric furnace in the presence of reducing and refining agents, thus forming a slag, neutralizing and saturating the slag by adding thereto silicious or titanic materials, removing the neutralized slag and bringing the molten chromium and iron mixtures together in a separate combination arc and resistance electric furnace and subjecting the combined mixtures to a final mixing, refining and deoxidizing process.

6. The method of producing a rustless iron alloy which consists in producing molten iron and partially refining the same, reducing the metal oxides of chromium ore in an electric furnace by the aid of suitable reducing and refining agents, thus forming a slag, neutralizing and saturating the slag by adding thereto, a substance rich in silicious or titanic oxides, removing the neutralized slag, mixing, refining and deoxidizing the molten chromium and iron mixture and using the removed slag as a fluxing medium, and a chromium oxide supply in the subsequent reduction of chromium ores.

In testimony whereof I hereunto affix my signature.

WILSON BENNETT.